(12) United States Patent
Kim et al.

(10) Patent No.: US 9,326,545 B2
(45) Date of Patent: May 3, 2016

(54) COATING COMPOSITION OF LOW IGNITION PROPENSITY CIGARETTE PAPER AND CIGARETTE USING THE SAME

(75) Inventors: Young-Sin Kim, Daejeon (KR); Bong-Su Cheong, Daejeon (KR); Seong-Ho Ju, Daejeon (KR); Jong-Oh Kim, Daejeon (KR); Sun-Cheol Kwon, Daejeon (KR)

(73) Assignee: KT & G CORPORATION, Daejeon (KR)

( * ) Notice: Subject to any disclaimer, the term of this patent is extended or adjusted under 35 U.S.C. 154(b) by 0 days.

(21) Appl. No.: 14/354,551

(22) PCT Filed: Jul. 19, 2012

(86) PCT No.: PCT/KR2012/005749
§ 371 (c)(1),
(2), (4) Date: May 8, 2014

(87) PCT Pub. No.: WO2013/062211
PCT Pub. Date: May 2, 2013

(65) Prior Publication Data
US 2014/0261503 A1    Sep. 18, 2014

(30) Foreign Application Priority Data

Oct. 25, 2011  (KR) .................. 10-2011-0109370
May 31, 2012  (KR) .................. 10-2012-0058304

(51) Int. Cl.
| | | |
|---|---|---|
| *A24D 1/02* | (2006.01) | |
| *C09D 103/02* | (2006.01) | |
| *D21H 21/34* | (2006.01) | |
| *D21H 19/14* | (2006.01) | |

(52) U.S. Cl.
CPC *A24D 1/02* (2013.01); *A24D 1/025* (2013.01); *C09D 103/02* (2013.01); *D21H 19/14* (2013.01); *C08L 2205/02* (2013.01)

(58) Field of Classification Search
USPC .................................. 131/332, 365; 162/139
See application file for complete search history.

(56) References Cited

U.S. PATENT DOCUMENTS

| | | | |
|---|---|---|---|
| 6,837,248 B2 | 1/2005 | Zawadzki et al. | |
| 7,237,559 B2* | 7/2007 | Ashcraft et al. | 131/365 |
| 2002/0179105 A1 | 12/2002 | Zawadzki et al. | |
| 2004/0231684 A1 | 11/2004 | Zawadzki et al. | |
| 2005/0287248 A1 | 12/2005 | Jabar et al. | |
| 2006/0005847 A1 | 1/2006 | Chapman et al. | |
| 2007/0246055 A1 | 10/2007 | Oglesby | |
| 2008/0011312 A1* | 1/2008 | Matsufuji et al. | 131/365 |
| 2008/0115794 A1 | 5/2008 | Oglesby | |
| 2008/0295854 A1 | 12/2008 | Li et al. | |
| 2009/0056729 A1 | 3/2009 | Zawadzki et al. | |
| 2012/0152266 A1* | 6/2012 | Volgger | 131/365 |
| 2013/0040158 A1* | 2/2013 | Marakainen et al. | 428/533 |

FOREIGN PATENT DOCUMENTS

| | | |
|---|---|---|
| CA | 2765295 A1 | 12/2010 |
| CN | 102199902 A | 9/2011 |
| EA | 200601538 A1 | 2/2007 |
| EP | 1569529 B1 | 4/2006 |
| JP | 08-134420 | 5/1996 |
| JP | 09-028366 | 2/1997 |
| JP | 10-503803 | 4/1998 |
| JP | 10-316779 | 12/1998 |
| JP | 2002-515925 A | 5/2002 |
| JP | 2003-089659 A | 3/2003 |
| JP | 2005-508648 A | 4/2005 |
| JP | 2006-517391 A | 7/2006 |
| JP | 2009-531056 A | 9/2009 |
| JP | 2011-516621 A | 5/2011 |
| RU | 2346629 C2 | 2/2009 |
| RU | 2412623 C1 | 2/2011 |
| WO | WO-97/42271 A1 | 11/1997 |
| WO | WO-2004/047572 A1 | 6/2004 |
| WO | WO-2009/068279 A1 | 6/2009 |
| WO | WO-2010/149380 A1 | 12/2010 |
| WO | WO 2011/131330 A1 * | 10/2011 |

OTHER PUBLICATIONS

Extended European Search Report dated Jul. 21, 2015, which issued in European Application No. 12843997.3.

* cited by examiner

*Primary Examiner* — Dennis Cordray
(74) *Attorney, Agent, or Firm* — McDermott, Will & Emery LLP

(57) ABSTRACT

The coating composition of a low ignition propensity cigarette paper according to an exemplary embodiment includes pregelatinized starch, maltodextrin, resistant maltodextrin and ethanol.

19 Claims, 1 Drawing Sheet

COATING COMPOSITION OF LOW IGNITION PROPENSITY CIGARETTE PAPER AND CIGARETTE USING THE SAME

TECHNICAL FIELD

A coating composition of a low ignition propensity cigarette paper and a cigarette using the same are provided.

BACKGROUND ART

In general, in order to manufacture cigarettes, first, various kinds of leaf tobaccos are mixed and processed to get the desired flavor and taste. Next, the processed leaf tobaccos are cut to prepare cut tobacco leaves, and the cut tobacco leaves are wrapped with a cigarette paper to provide filter-less cigarette. Then, a filter is attached to the filter-less cigarette, if necessary.

A cigarette filter may include activated carbon, flavoring materials and the like, and may be composed of a mono-filter or a multi-filter, and the cigarette filter is surrounded by a cigarette filter wrapping paper. The cut tobacco leaves and the cigarette filter are connected with each other by a tipping paper, and the tipping paper may include fine holes.

A cigarette paper may be manufactured such that a target tar and a target nicotine may be carried out by appropriate porosity and combustibility during smoking, and may be manufactured such that smoke flavor which cigarettes intrinsically have may be imparted. The cigarette paper may be manufactured of flax, wood pulp and the like.

A material such as starch is coated on a low ignition propensity cigarette paper in the form of a band and the porosity of the coated band is low. Accordingly, when the combustion of a cigarette reaches a band portion, the amount of oxygen inflow to a cut tobacco leaf is reduced and thus the cigarette may be extinguished.

The above information disclosed in this Background section is only for enhancement of understanding of the background of the invention and therefore it may contain information that does not form the prior art that is already known in this country to a person of ordinary skill in the art.

DISCLOSURE OF INVENTION

Technical Problem

An exemplary embodiment may improve the workability of the manufacturing process of cigarette paper including coating while reducing the porosity of the cigarette paper.

An exemplary embodiment may be used to achieve other problems which have not been specifically mentioned in addition to the problem.

Solution to Problem

An exemplary embodiment of the present invention provides a coating composition of a low ignition propensity cigarette paper, including: pregelatinized starch; maltodextrin; and ethanol.

The coating composition may further include resistant maltodextrin.

The coating composition may further include inulin.

The coating composition may further include oxidized pregelatinized starch.

The coating composition may further include propylene glycol, glycerin, or a combination thereof.

The coating composition may further include D-sorbitol.

The pregelatinized starch, the maltodextrin and the ethanol may be included in an amount of about 5 wt % to about 20 wt %, about 5 wt % to about 40 wt % and about 10 wt % to about 40 wt %, respectively based on the entire coating composition.

The weight ratio of the pregelatinized starch and the maltodextrin may be about 1:0.5 to about 1:8.0.

Another exemplary embodiment of the present invention provides a cigarette including: a cigarette column portion; and a low ignition propensity cigarette paper surrounding the cigarette column portion and including a coating portion, in which the coating portion includes pregelatinized starch and maltodextrin.

The coating portion may further include inulin.

The coating portion may further include oxidized pregelatinized starch.

The coating portion may further include D-sorbitol.

The cigarette may further include a cigarette filter portion.

The cigarette filter portion may include at least one filter member.

The cigarette filter portion may include at least one of an adsorbent or a flavoring agent.

Advantageous Effects of Invention

Exemplary embodiments may improve the workability of the manufacturing process of the cigarette paper including coating while reducing the porosity of the cigarette paper.

MODE FOR INVENTION

Figure 1:
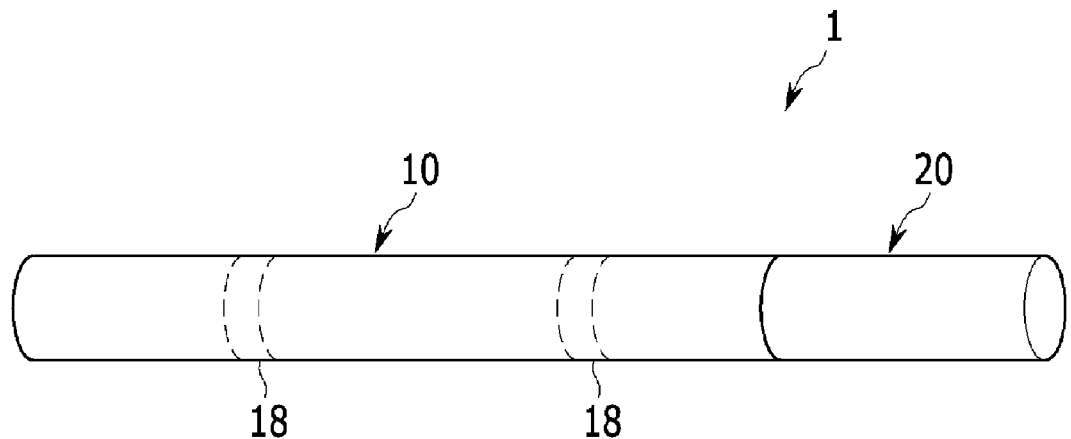
FIG. 1 is a perspective view schematically illustrating a cigarette according to an exemplary embodiment.

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention. The drawings and description are to be regarded as illustrative in nature and not restrictive. Like reference numerals designate like elements throughout the specification In addition, the detailed description of the widely known technologies will be omitted.

Hereinafter, a cigarette paper and a cigarette according to exemplary embodiments of the present invention will be described in detail with reference to FIGS. 1 to 3.

Figure 2:
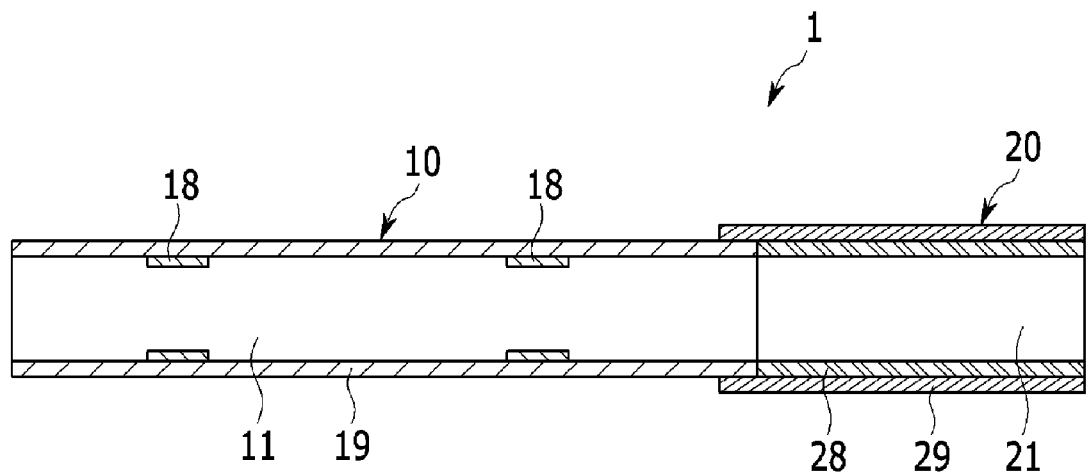
FIG. 2 is a cross-sectional view schematically illustrating a cigarette according to an exemplary embodiment.
Figure 3:
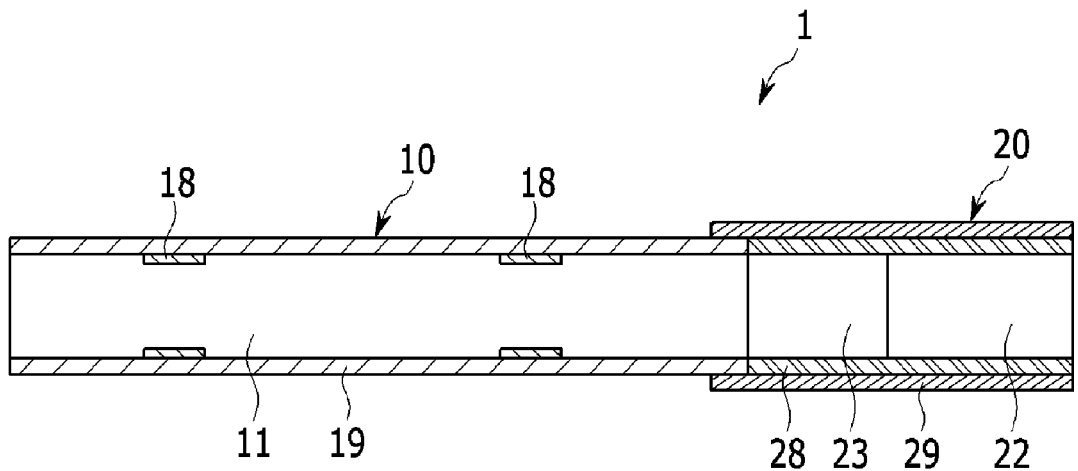
FIG. 3 is a cross-sectional view schematically illustrating a cigarette according to an exemplary embodiment.

FIG. 1 is a perspective view schematically illustrating a cigarette according to an exemplary embodiment of the present invention, FIG. 2 is a cross-sectional view schematically illustrating a cigarette according to an exemplary embodiment of the present invention, and FIG. 3 is a cross-sectional view schematically illustrating a cigarette according to an exemplary embodiment of the present invention.

Referring to FIGS. 1 and 2, a cigarette 1 includes a cigarette column portion 10 combusted by fire and a cigarette filter portion 20 filtering cigarette smoke. The cigarette column portion 10 may be surrounded by a cigarette paper 19, and the cigarette filter portion 20 may be surrounded by a cigarette filter wrapping paper 28. The cigarette column portion 10 and the cigarette filter portion 20 may be connected with each other by a tipping paper 29. The circumference of the cigarette may be approximately 5 mm to approximately 30 mm. The cigarette filter portion 20 may be omitted.

The cigarette column portion 10 includes cut tobacco leaves 11 cut from leaf tobaccos processed by various methods.

The cigarette filter portion 20 may include a first filter portion 21. The first filter portion 21 may be formed of acetate tow, paper and the like. The cigarette filter portion 20 may be a multi-filter including two or more filter members. For example, referring to FIG. 3, the cigarette filter portion 20 may include a second filter portion 22 and a third filter portion 23. Besides, the cigarette filter portion 20 may include three filter members, four filter members, and multi-filter members.

The cigarette filter portion 20 may include an adsorbent, a flavoring agent and the like. For example, the adsorbent may be activated carbon and the like, and the flavoring agent may be an herb flavoring material and the like. In the multi-filter, one or more filter members may include at least one of the adsorbent or the flavoring agent. For example, referring to FIG. 3, at least one of the second filter portion 22 or the third filter portion 23 may include at least one of the adsorbent or the flavoring agent.

The cigarette paper 19 includes one or more coating portions 18. For example, the coating portion 18 may be in the form of a band, and may have various shapes instead of the form of a band. The number, thickness and shape of the coating portions 18 may be variously modified, and the interval of a plurality of coating portions 18 may be variously modified. The coating portion 18 may reduce the porosity of the cigarette paper 19, and accordingly, when the combustion of a cigarette reaches the coating portion 18, the amount of oxygen inflow to the cigarette column portion 10 is reduced and thus the cigarette 1 may be extinguished. The cigarette paper 19 including the coating portion 18 refers to a low ignition propensity cigarette paper. A coating composition is coated on the coating portion 18. For example, the porosity of the cigarette paper 19 may be approximately 85 cu or less, and the porosity of the coating portion 18 may be approximately 5 cu to approximately 20 cu. The thickness of the base paper of the cigarette paper may be about 30 μm to about 60 μm, and the basis weight of the base paper may be about 15 g/m² to about 40 g/m². The thickness of the coating portion 18 may be about 5 μm or less, and the basis weight of the coating portion 18 may be about 15 g/m² or less. The weight ratio of the coating composition based on the entire weight of the cigarette paper 19 and the coating composition may be approximately 40 wt % or less. When the coating portion 18 is in the form of a band, the weight of the coating composition per band may be approximately 2.5 mg or less.

The coating composition includes pregelatinized starch, maltodextrin and ethanol.

Pregelatinized starch may be prepared by rapidly drying raw starch at high temperature, and this treatment also refers to pregelatinization treatment. For example, pregelatinized starch may be prepared by heating an about 40% raw starch solution at about 100 degree of Celsius or higher and rapidly drying the solution. Raw starch has high viscosity characteristics at low concentration, and is not dispersed or dissolved in iced water. Raw starch may also be solidified due to rapid retrogradation. However, pregelatinized starch does not have high viscosity characteristics at low concentration, and is easily dispersed or dissolved even in iced water. Pregelatinized starch may also delay retrogradation. Accordingly, pregelatinized starch may improve the workability of the coating process. Pregelatinized starch may be, for example, amylopectin. Amylopectin is a non-soluble component that soluble amylose is removed. Amylopectin has a network structure, and has a characteristic that a soft film is formed. Therefore, amylopectin may have smoothness high enough to withstand external impact. Pregelatinized starch may be used in an amount of about 3 wt % to about 20 wt % based on the entire coating composition, and when pregelatinized starch is used within the range, the workability of the coating process may be improved.

Maltodextrin may lower the retrogradation rate of pregelatinized starch effectively. Maltodextrin has excellent film-forming ability, excellent dryness, and high solubility, and advantageously infiltrates into the cigarette paper due to the small size of molecules. Maltodextrin may be dissolved in ethanol, and thus may lower the viscosity of the coating composition and may enhance the binding strength between constituting components of the coating composition when used with ethanol. Maltodextrin may be used in an amount of about 5 wt % to about 40 wt % based on the entire coating composition, and when maltodextrin is used within this range, film-forming ability and dryness may be improved.

Ethanol may increase the solid content of the coating composition, and may deteriorate and maintain the viscosity of pregelatinized starch. The Table 1 shows a change in viscosity of the coating composition according to the content of ethanol based on the entire coating composition.

TABLE 1

| Ethanol content(wt %) | Viscosity of the coating composition over time (cps) | | | |
| --- | --- | --- | --- | --- |
| | Immediately after the manufacture | 4 hr | 24 hr | 48 hr |
| 0 | 2,500 | 8,600 | 11,500 | 12,300 |
| 5 | 2,200 | 5,200 | 8,100 | 9,300 |
| 10 | 2,100 | 3,400 | 4,400 | 5,200 |
| 15 | 1,400 | 2,300 | 3,400 | 4,600 |
| 20 | 1,400 | 1,400 | 1,400 | 1,400 |

Further, ethanol may elongate the estimated usable period of the coating composition. Ethanol may improve the drying efficiency of moisture of the coating composition and may prevent the deterioration of strength according to the moisture absorption of the cigarette paper. Ethanol may be used in an amount of about 10 wt % to about 40 wt % based on the entire coating composition, and when ethanol is used within this range, the viscosity of the coating composition may be effectively maintained and dryness may be improved. Ethanol is evaporated in the manufacturing process of cigarette paper, and may not be included in the coating portion 18.

The coating composition includes water. For example, water may be used in an amount of about 30 wt % to 80 wt %. Water is evaporated in the manufacturing process of cigarette paper, and may not be included in the coating portion 18.

The coating composition may include resistant maltodextrin. The resistant maltodextrin may control the film forming degree of pregelatinized starch and maltodextrin, and may improve the drying effects due to high drainage. Resistant maltodextrin may be used in an amount of about 5 wt % to about 25 wt % based on the entire coating composition, and when resistant maltodextrin is used within this range, the film forming degree may be effectively controlled.

The coating composition may include inulin. Inulin may improve the film forming ability of the coating composition and may lower the viscosity of the coating composition. Inulin may be used in an amount of about 1 wt % to about 20 wt % based on the entire coating composition, and when inulin is used within this range, the film forming ability of the coating composition may be improved.

The coating composition may include oxidized pregelatinized starch. Oxidized pregelatinized starch may serve as filler. Oxidized pregelatinized starch may be used in an amount of about 1 wt % to about 20 wt % based on the entire coating composition, and when oxidized pregelatinized starch is used within this range, the oxygen blocking ability of cigarette paper may be effectively maintained.

The coating composition may include propylene glycol, and propylene glycol may improve the workability of the manufacturing process of cigarette paper. Propylene glycol may be used in an amount of about 1 wt % to about 10 wt % based on the entire coating composition, and when propylene glycol is used within this range, the workability of the manufacturing process of cigarette paper may be effectively improved. Propylene glycol is evaporated in the manufacturing process of cigarette paper, and may not be included in the coating portion 18.

The coating composition may include glycerin, and glycerin may improve the workability of the manufacturing process of cigarette paper. Glycerin may be used in an amount of about 1 wt % to about 10 wt % based on the entire coating composition, and when glycerin is used within this range, the workability of the manufacturing process of cigarette paper may be effectively improved. Glycerin is evaporated in the manufacturing process of cigarette paper, and may not be included in the coating portion 18.

The coating composition may include D-sorbitol, and D-sorbitol may improve the workability of the manufacturing process of cigarette paper. D-sorbitol may serve as filler. D-sorbitol may be used in an amount of about 10 wt % to about 20 wt % based on the entire coating composition, and when D-sorbitol is used within this range, the oxygen blocking ability of cigarette paper may be effectively maintained.

The coating composition fills pore spaces inside the cigarette paper, and if the viscosity of the coating composition is low, the optical characteristics of the cigarette paper may be deteriorated. For example, when the viscosity of the coating composition is too low, the white chromaticity and opacity of the cigarette paper may be decreased. Therefore, the viscosity of the coating composition needs to be appropriately maintained. Furthermore, when the viscosity of the coating composition is too low, the infiltration rate of the coating composition in the cigarette paper increases and thus the amount of pregelatinized starch remaining on the surface of the cigarette paper decreases, thereby reducing the blocking ability of oxygen inflow. Accordingly, it is preferred that the viscosity of the coating composition is appropriately maintained in consideration of the optical characteristic of the cigarette paper and the infiltration rate of the coating composition inside the cigarette paper. For example, the viscosity of the coating composition may be about 1,000 cps to about 8,500 cps at about 25 degree of Celsius and about 20 rpm, and the mixing weight ratio of pregelatinized starch and maltodextrin may be approximately 1:0.5 to approximately 1:8.0 in order to maintain the viscosity within this range.

In the coating composition, the solid content may be approximately 50 wt % or less. In the coating composition, the weight ratio of the solid content and the ethanol content may be about 1:0.25 to about 1:0.85.

The cigarette paper 19 may include filler, and accordingly, the opacity of the cigarette paper may increase and the porosity may be imparted to the cigarette paper, the smoothness and ash solidification of the cigarette paper may be improved, and the white chromaticity of the cigarette paper may increase.

Examples of the filler include materials such as calcium carbonate, titanium dioxide, magnesium oxide and the like. The filler may be used in an amount of about 20 wt % to about 40 wt % based on the entire weight of the cigarette paper.

Hereinafter, the present invention will be described in more detail with reference to Examples, but the following Examples are just the examples of the present invention and the present invention is not limited thereto.

EXAMPLE 1

About 15 wt % of pregelatinized starch, about 25 wt % of maltodextrin, about 15 wt % of ethanol and about 45 wt % of water are mixed to prepare a coating composition. The prepared coating composition is coated on a cigarette paper having a porosity of about 60 CU, and two bands with a width of about 7 mm are formed on the cigarette paper at an interval of about 20 mm. The porosity of the band is about 8 CU. The manufactured cigarette paper is used to manufacture a cigarette.

COMPARATIVE EXAMPLE 1

A coating composition in which sodium alginate is included is coated on a cigarette paper having a porosity of about 82 CU, and two bands with a width of about 7 mm are formed on the cigarette paper at an interval of about 20 mm. The porosity of the band is about 12.5 CU. The manufactured cigarette paper is used to manufacture a cigarette.

Measurement of Physical Properties of Cigarette

The physical properties of cigarettes manufactured in the Example 1 and Comparative Example 1 are shown in the following Table 2.

TABLE 2

|  | Cigarette column weight(mg/cig.) | circumference(mm) | Air dilution rate(%) | UPD (mmH$_2$O) | EPD (mmH$_2$O) |
|---|---|---|---|---|---|
| Example 1 | 592 | 24.47 | 63.6 | 85.2 | 167 |
| Comparative Example 1 | 590 | 24.5 | 63 | 84 | — |

Referring to the Table 2, physical properties of the cigarettes in Example 1 and Comparative Example 1 are similar to each other.

Measurement of Smoke Components of Cigarette

The smoke components of the cigarettes manufactured in Example 1 and Comparative Example 1 are measured and shown in the following Table 3.

TABLE 3

|  | Tar(mg/cig.) | Nicotine(mg/cig.) | CO(mg/cig.) | TPM(mg/cig.) | Puff No. |
|---|---|---|---|---|---|
| Example 1 | 3.4 | 0.34 | 5.3 | 5.1 | 8.5 |
| Comparative Example 1 | 3.3 | 0.34 | 5.3 | 5.0 | 8.5 |

Referring to the Table 3, the smoke components of the cigarettes in Example 1 and Comparative Example 1 are similar to each other.

Measurement of Combustion Strength of Cigarettes

The combustion strength of the cigarettes manufactured in Example 1 and Comparative Example 1 are measured and shown in the following Table 4. ASTM is a measurement method of combustion strength in US, the fire extinguishing rate of a cigarette laid on ten sheets of filter papers is measured, and the higher the fire extinguishing rate is, the better the combustion strength is. The free air self-extinguish (FASE) is a fire extinguishing rate in a smoldering state, and the lower the FASE is, the better the combustion strength is.

TABLE 4

|  | ASTM | FASE |
|---|---|---|
| Example 1 | 100% | 46.7% |
| Comparative Example 1 | 100% | 63.3% |

Referring to the Table 4, the combustion strength of the cigarette in Example 1 is better than the combustion strength of the cigarette in Comparative Example 1.

Measurement of Workability of Manufacturing Cigarette

The manufacturing apparatus of the cigarette in Example 1 was stopped three times, and the manufacturing apparatus of the cigarette in Comparative Example 1 was stopped four times. Accordingly, it can be known that the workability of manufacturing cigarette in Example 1 has been improved, compared to the workability of manufacturing cigarette in Comparative Example 1.

Sensory Evaluation of Cigarette

The quality of the cigarettes prepared in Example 1 and Comparative Example 1 is evaluated by a panel consisting of 16 persons, and the results are shown in the following Table 5.

TABLE 5

|  | Example 1 | Comparative Example 1 |
|---|---|---|
| Off-flavor before smoking | 2.0 | 2.4 |
| Abundant amount of smoke | 3.7 | 3.7 |
| Strength of tobacco taste | 3.7 | 3.6 |
| Swallowing smoothness | 3.8 | 4.1 |
| Off-flavor when smoked at a band portion | 2.8 | 2.7 |
| Total tobacco taste | 3.8 | 4.1 |

Referring to the Table 5, the quality of the cigarettes in Example 1 and Comparative Example 1 is similar to each other.

While this invention has been described in connection with what is presently considered to be practical exemplary embodiments, it is to be understood that the invention is not limited to the disclosed embodiments, but on the contrary, is intended to cover various modifications and equivalent arrangements included within the spirit and scope of the appended claims.

The invention claimed is:

1. A coating composition of a low ignition propensity cigarette paper, comprising:
   pregelatinized starch,
   maltodextrin,
   ethanol, and
   water,
   wherein the pregelatinized starch, the maltodextrin, the ethanol, and the water are included in an amount of about 5 wt % to about 20 wt %, about 5 wt % to about 40 wt %, about 10 wt % to about 40 wt %, and about 30 wt % to about 80 wt % respectively, based on the coating composition.

2. The coating composition of claim 1, further comprising: resistant maltodextrin, inulin, or a combination thereof.

3. The coating composition of claim 2, further comprising: oxidized pregelatinized starch.

4. The coating composition of claim 3, further comprising: propylene glycol, glycerin, or a combination thereof.

5. The coating composition of claim 4, further comprising: D-sorbitol.

6. The coating composition of claim 1, further comprising: oxidized pregelatinized starch.

7. The coating composition of claim 6, further comprising: propylene glycol, glycerin, or a combination thereof.

8. The coating composition of claim 7, further comprising: D-sorbitol.

9. The coating composition of claim 1, wherein:
   the coating composition consists essentially of the pregelatinized starch, the maltodextrin, the ethanol, and the water.

10. The coating composition of claim 9, wherein:
    a weight ratio of the pregelatinized starch and the maltodextrin is about 1:0.5 to about 1:8.0.

11. A cigarette, comprising:
    a cigarette column portion, and
    a low ignition propensity cigarette paper surrounding the cigarette column portion and comprising a coating portion provided by a coating composition,
    wherein the coating comprises pregelatinized starch, maltodextrin, and ethanol,
    wherein the pregelatinized starch, the maltodextrin, and the ethanol are included in an amount of about 5 wt % to about 20 wt %, about 5 wt % to about 40 wt %, and about 10 wt % to about 40 wt %, respectively, based on the coating composition.

12. The cigarette of claim 11, wherein:
    the coating portion further comprises resistant maltodextrin, inulin or a combination thereof.

13. The cigarette of claim 12, wherein:
    the coating portion further comprises oxidized pregelatinized starch.

14. The cigarette of claim 13, wherein:
    the coating portion further comprises D-sorbitol.

15. The cigarette of claim 11, wherein:
    the coating portion further comprises oxidized pregelatinized starch.

16. The cigarette of claim 15, wherein:
    the coating portion further comprises D-sorbitol.

17. The cigarette of claim 11, further comprising:
    a cigarette filter portion.

18. The cigarette of claim 17, wherein:
    the cigarette filter portion comprises at least one filter member.

19. The cigarette of claim 18, wherein:
    the cigarette filter portion comprises at least one of an adsorbent or a flavoring agent.

* * * * *